Dec. 4, 1928.
B. C. CLUTTER
1,693,809
POWER SHOVEL OR EXCAVATOR
Filed Jan. 4, 1926     4 Sheets-Sheet 3
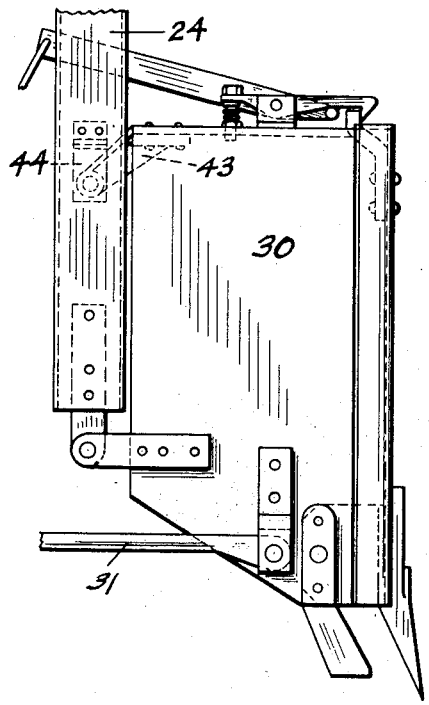
FIG.-8
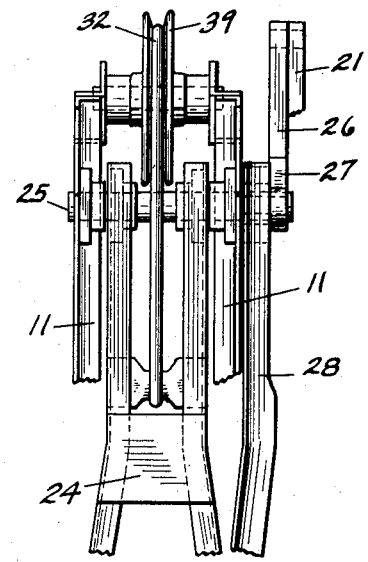
FIG.-4
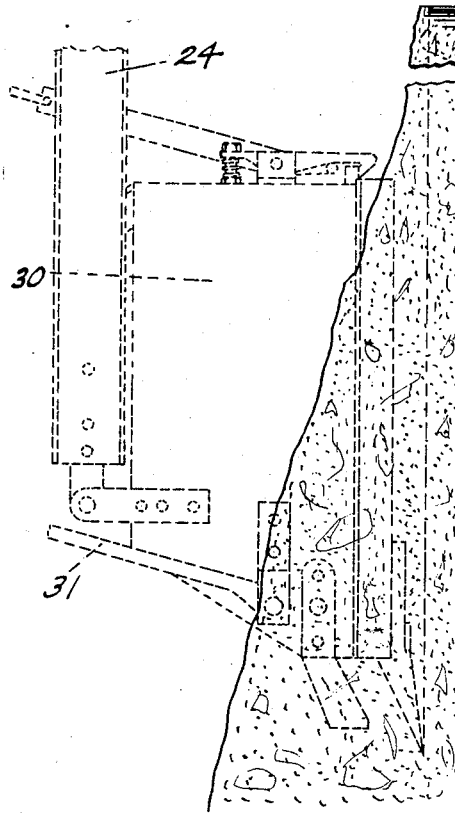
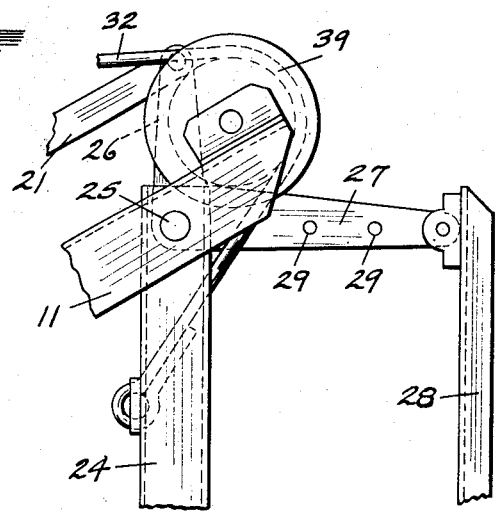
FIG.-5
INVENTOR.
BIRD C. CLUTTER
BY
ATTORNEY.

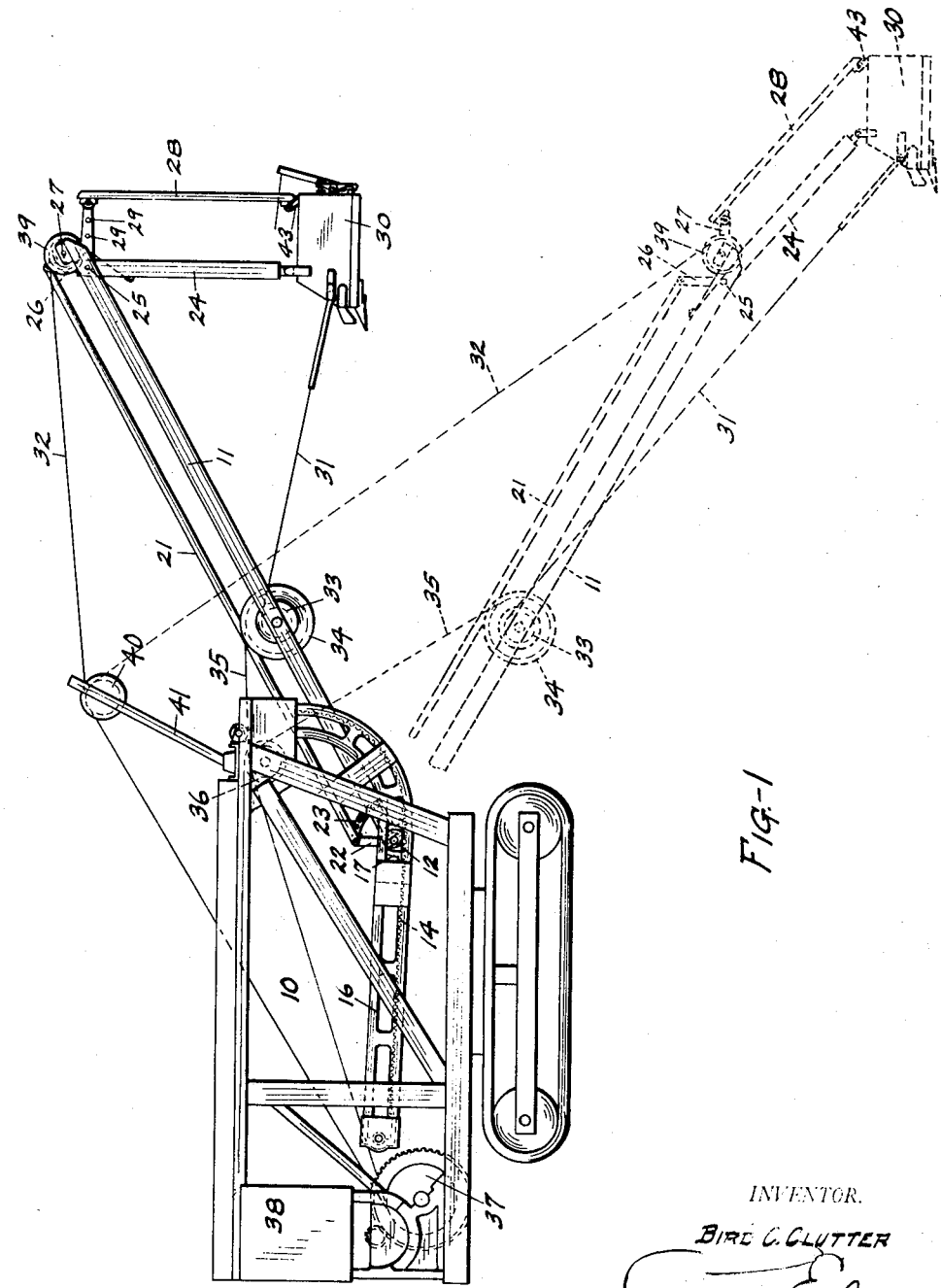

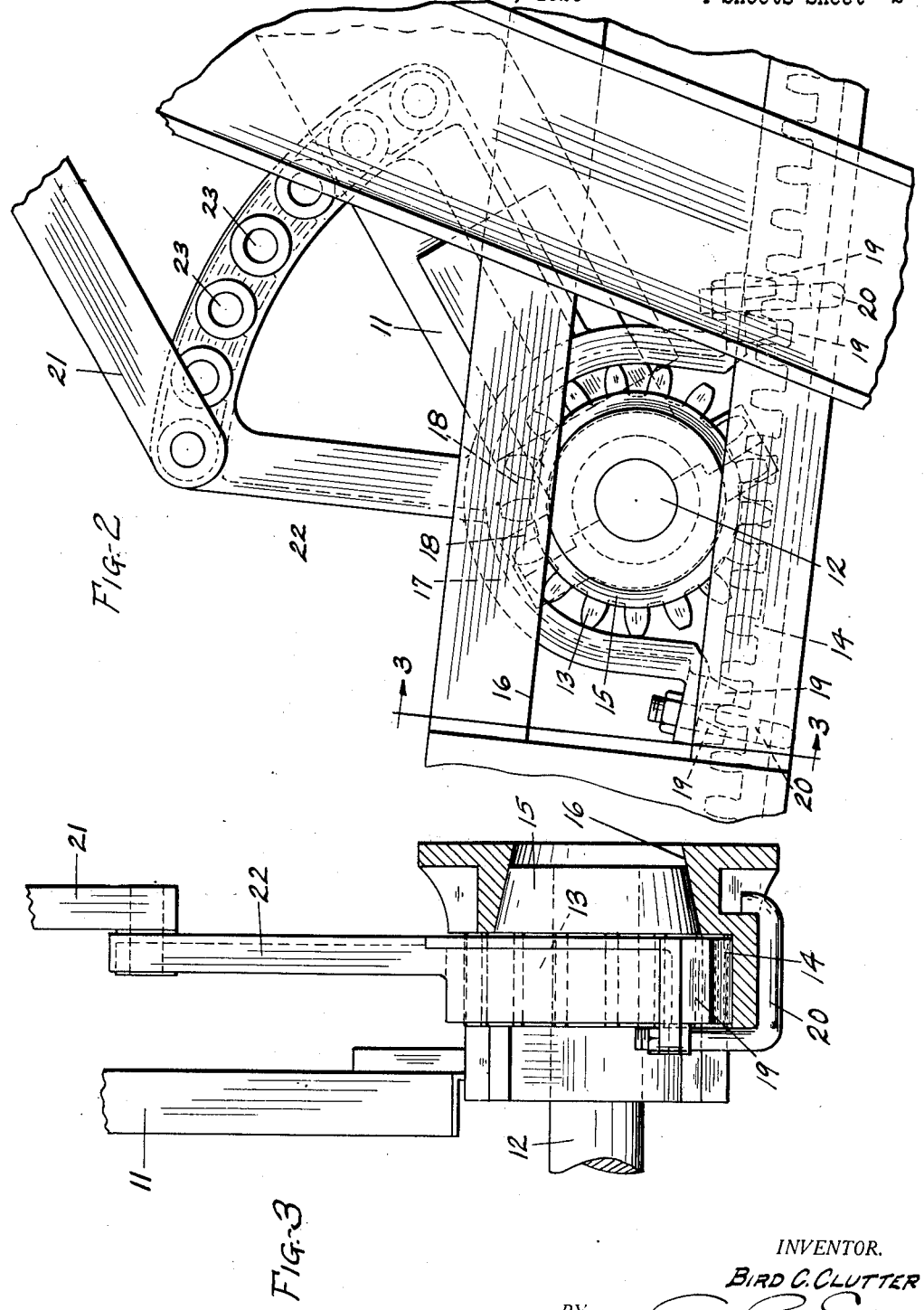

Dec. 4, 1928.
B. C. CLUTTER
1,693,809
POWER SHOVEL OR EXCAVATOR
Filed Jan. 4, 1926
4 Sheets-Sheet 4
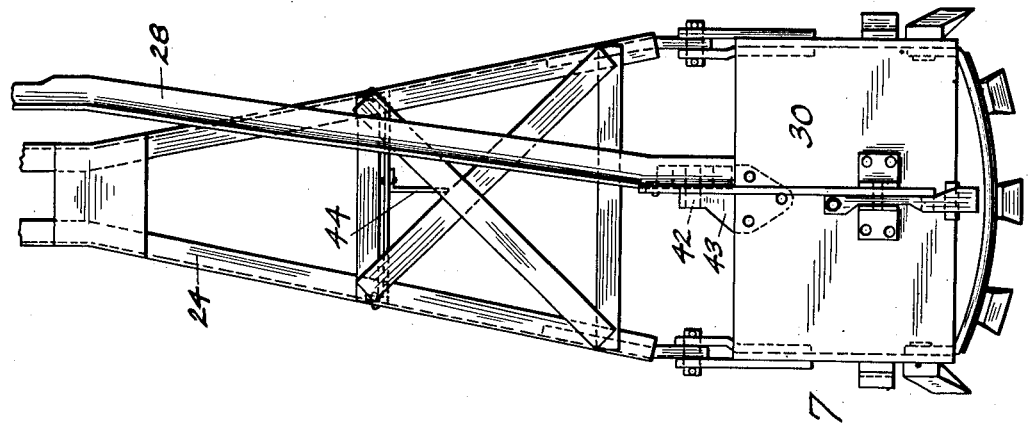
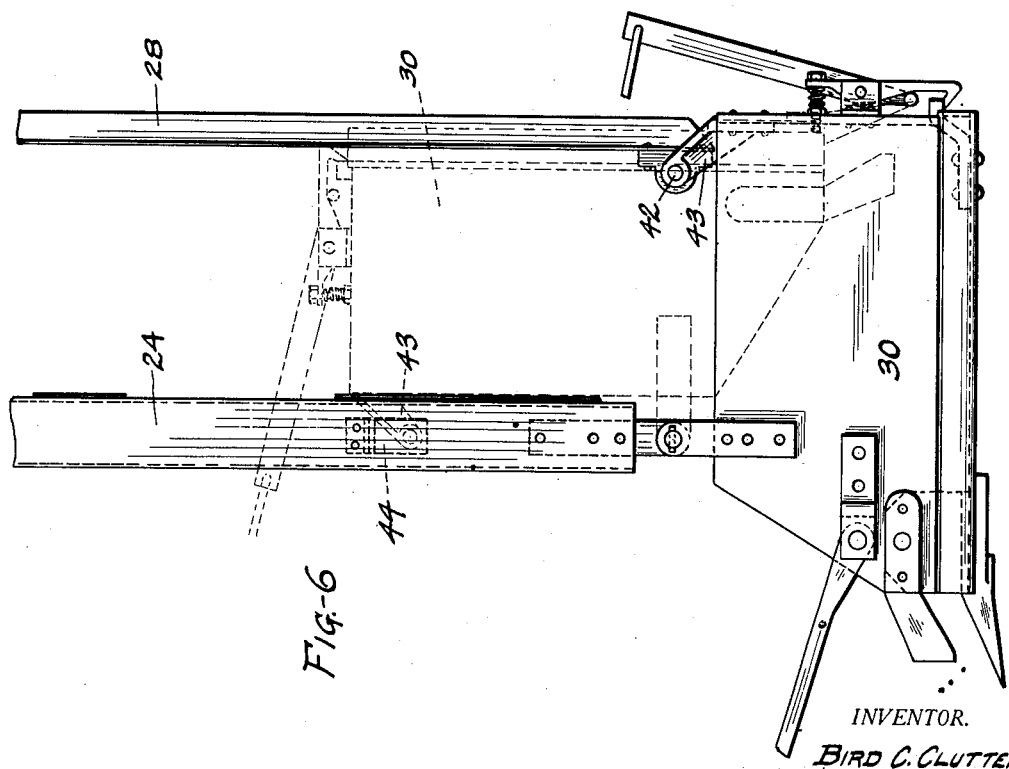
INVENTOR.
BIRD C. CLUTTER
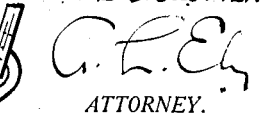
ATTORNEY.

Patented Dec. 4, 1928.

1,693,809

UNITED STATES PATENT OFFICE.

BIRD C. CLUTTER, OF AKRON, OHIO, ASSIGNOR, BY MESNE ASSIGNMENTS, TO CLUTTER-WAGNER, INC., A CORPORATION OF OHIO.

POWER SHOVEL OR EXCAVATOR.

Application filed January 4, 1926. Serial No. 79,069.

This invention relates to power shovels or excavators, and particularly to ditcher attachments for power shovels.

The general object of the invention is to improve upon ditcher attachments for power shovels, and specifically to improve upon the means for controlling the operation of the ditcher, to improve upon the manner of securing the attachment onto the shovel frame and to provide a ditcher scoop capable of being adjusted into a position for performing a raking action, as for example, on walls, etc. The construction employed for mounting the ditcher on the frame also is adapted for mounting of other of the well known excavator attachments thereon.

The foregoing and other objects are obtained by the construction illustrated in the accompanying drawings and described in detail below. It is to be understood that the invention is not limited to the specific form thereof shown and described.

Of the accompanying drawings:

Figure 1 is a side elevation of a known type of shovel apparatus having the ditcher attachment of the invention mounted thereon;

Figure 2 is a detail side elevation of a mounting for the boom on the shovel frame and Figure 3 is a section therethrough on line 3—3 of Figure 2;

Figure 4 is an end elevation and Figure 5 is a side elevation of a portion of the "pullback" means for controlling the "dipper" stick;

Figure 6 is a side elevation and Figure 7 is an end elevation of the scoop and illustrating the positions to which it may be adjusted on the dipper stick;

Figure 8 is a view illustrating the operation of the ditcher scoop as a rake on the side of a wall.

Referring to the drawings, 10 illustrates a power shovel or excavating apparatus which may be of the full revolving type and which, as shown, is of that type described in Reissue Patent No. 16,107, granted July 7, 1925, to LeRoy P. Clutter et al., the boom shown in that patent being removed and replaced by the ditcher attachment of the invention which includes a boom 11 pivoted on a shaft 12 consituting the shaft supporting the boom in the patented construction and on which are gears as shown at 13 meshed with racks indicated at 14, and on which are also rollers 15 operable on a track 16. The shaft 12 with rollers 15 operable on tracks 16 and with gears 13 operable by racks 14 constitute the operating means for the scoop carrying boom in the patent referred to, to which the boom mount here shown is adapted.

The tracks 16 provide a support on which the shaft 12 may be secured in any desired position to provide a fixed pivot for the boom 11. For securing the shaft 12 in position, a clevis 17 is provided for cooperation with each gear 13. Each clevis 17 is formed on its inner curved periphery with a plurality of gear-like teeth 18, 18 arranged to mesh in the teeth of a gear 13 and formed on the bottom of its feet with gear-like teeth 19, 19 adapted to mesh with the teeth of each rack 14. Each clevis 17 has hook-bolts 20, 20 on the feet thereof arranged to engage under racks 14 to clamp the clevis tightly in place and by means of the engagement of teeth 18 with each gear 13 positively clamping shaft 12 in place in any desired position.

The ditcher boom 11 may be of any suitable type and may carry the scoop paralleling attachment disclosed and claimed in a copending application of the present inventor, Serial No. 641,532, filed May 26, 1923, which has matured into Patent No. 1,561,694, granted Nov. 17, 1925, and which includes a link 21 which, in the present construction, is adjustably but fixedly pivoted on the shovel frame 10 by means of a fan-shaped bracket 22 formed integral with a clevis 17 and having a series of apertures 23, 23 arranged along an arc to receive a pivot pin for link 21. Adjustability of the pivot of link 21 on the shovel frame bodily with the pivot of the boom 12 is necessary for obvious reasons, but adjustment of the pivot of link 21 on bracket 22 along the arc shown is necessary for the reason that where clevis 17 is secured onto the arc-shaped portion of tracks 16 adjacent the front of the shovel frame, the bracket 22 will assume an angular position different from that on a straight portion of the tracks.

The dipper stick is shown at 24 and is pivoted at 25 on the boom. The link 21 of the paralleling attachment is pivoted on one arm 26 of a bell crank lever pivoted on boom 11 with dipper stick 24 and the other arm 27 of which has pivotally connected thereto the link 28. The pivot of link 28 on arm 27 is adjustable to apertures 29, 29 in arm 27 for changing the angularity of the scoop as disclosed in the latter patent referred to.

Of course the means disclosed is adapted for securing any of the other known excavator attachment booms on the type of shovel referred to.

The scoop, designated by the numeral 30, may be of any suitable type and is pivotally secured on the lower end of stick 24 and has removably attached thereto the lower end of link 28. Control of the scoop is accomplished by means of a drag line 31 connected thereto and by means of a hoist line 32 so connected to dipper stick 24 as to operate as a "pull back" line also. Line 31 winds onto a drum 33 of small diameter journaled onto boom 11 and rotatively connected to a larger drum 34 journaled on said boom on which winds a line 35 passing over a sheave 36 on shovel frame 10 and winding onto one of a set of power driven drums 37 driven by the prime mover 38 of the shovel apparatus and controlled by the usual devices (not shown).

The hoist line 32 is connected to the dipper stick 24 below its pivot on the boom 11 and is trained outwardly about a sheave 39 on the outer end of the boom, over a sheave 40 supported on a bracket 41 on shovel 10, and winding onto another of drums 37. By this means a pull on the line 32 will be directly effective either to hoist the boom or to swing back the dipper stick 24 to the position shown in dotted lines in Figure 1, or both actions simultaneously depending upon the proper manipulation of line 31.

It is contemplated that an effective rake may be obtained by supporting scoop 30 on dipper stick 24 in parallelism with said stick. To this end link 28 is removably attached to the scoop as by means of a bolt or pin 42 passed into an aperture in a bracket 43 secured on the rear end of scoop 30. Accordingly link 28 may be removed to permit the scoop 30 to be swung to the dotted line position shown in Figure 6. To secure the scoop 30 in the dotted line position, an apertured bracket 44 may be so mounted on dipper stick 24 that when scoop 30 is swung to said position, a pin such as 42 may be engaged through brackets 43 and 44 to hold the scoop in place.

In the use of the device, the boom pivot 12 is first secured by means of the clevises 17 in the position of the shovel frame which will be most effective, depending on the particular working conditions. The boom 11 is then pivotally secured on shaft 12, the paralleling attachment being applied or not as desired, this attachment not being a feature of the present invention. The drag line 31 and pull back line 32 are then connected up in the manner shown in Figure 1.

In operation, an excavating or digging action is obtained by pulling the dipper stick 24 out as far as necessary, it being possible to pull it out to a position substantially as shown in dotted lines in Figure 1 by proper operation of lines 31 and 32, and at the same time permitting boom 11 to descend to carry the scoop to digging position. Crowding of the scoop through the ground is then effected by line 31, line 32 being permitted to pay out as will be understood. When the scoop is loaded, lines 31 and 32 are so controlled as to elevate the boom 11, line 31 being tensioned and the elevation or hoisting being accomplished by the line 32. The load may now be dumped in the usual way.

When it is desired to use the scoop as a rake, the scoop 30 is adjusted to the dotted line position of Figure 6 and is operated down a wall by proper control of the stick 24 with lines 31 and 32 in the manner illustrated in Figure 8.

It will appear from the foregoing that the ditcher scoop attachment of the invention has several important novel features, namely, adjustable mounting on the shovel frame to suit various working conditions; adjustable mounting of the scoop on dipper stick to provide a rake; and provision of a power-increasing drum construction in the drag line. It will also be apparent that the mounting for the ditcher boom may be employed for mounting of other types of excavator attachments thereon.

Modifications of the invention may be resorted to without departing from the spirit thereof and the scope of the appended claims.

What is claimed is:

1. The combination with an excavator apparatus having a scoop-crowding rack extending forwardly on the frame thereof and a shaft having a gear meshed with said rack, of an excavator attachment pivoted on said shaft and a clevis adapted to be clamped over said gear and onto said rack, said clevis having teeth adapted to mesh with said gear and other teeth adapted to mesh with said rack to secure said shaft in any desired position on said rack.

2. The combination with an excavator apparatus having a forwardly extending track in its frame and a pivot member adapted to be moved along said track, of an excavator attachment including a main boom adapted to be mounted on the pivot member, and means for securing said member on the track in any desired position.

3. The combination with an excavator apparatus having a forwardly extending track in its frame, said track extending upwardly at its forward end, and a pivot member adapted to be moved along said track, of an excavator attachment including a main boom adapted to be mounted on the pivot member, and means for securing said member on the track in any desired position.

4. In a ditcher attachment for power shovel apparatus, a dipper stick, a scoop pivoted adjacent its mouth on said dipper stick, means for normally holding the scoop substantially horizontal, and means whereby the scoop may be connected to said stick in an adjusted substantially vertical position, whereby said scoop is converted into a rake.

5. In a ditcher attachment for power shovel apparatus, a dipper stick, a scoop mounted on the stick, means for holding the scoop in a substantially horizontal position on the stick, and means for holding the scoop in an adjusted vertical position on the stick whereby it may function as a rake.

BIRD C. CLUTTER.